United States Patent
Nomura et al.

(10) Patent No.: US 8,245,768 B2
(45) Date of Patent: Aug. 21, 2012

(54) AIR-CONDITIONING SYSTEM FOR ELECTRIC CAR AND METHOD OF CONTROLLING THE AIR-CONDITIONING SYSTEM

(75) Inventors: Eiji Nomura, Anjyo (JP); Kou hei Umezu, Okazaki (JP); Masaru Kadoi, Anjyo (JP); Shinya Fujiwara, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 374 days.

(21) Appl. No.: 12/579,153

(22) Filed: Oct. 14, 2009

(65) Prior Publication Data
US 2010/0089564 A1  Apr. 15, 2010

(30) Foreign Application Priority Data

Oct. 15, 2008 (JP) ................. 2008-266623

(51) Int. Cl.
*B60H 1/00* (2006.01)
*B60H 3/00* (2006.01)
*B60H 1/32* (2006.01)

(52) U.S. Cl. ............ 165/202; 165/44; 165/271; 62/133; 62/241

(58) Field of Classification Search .......... 165/202, 165/41, 44, 42, 43, 201, 271, 287; 62/241, 62/243, 133
See application file for complete search history.

(56) References Cited

U.S. PATENT DOCUMENTS

| | | | |
|---|---|---|---|
| 5,330,385 A | 7/1994 | Hotta et al. | |
| 6,178,760 B1 | 1/2001 | Tanaka et al. | |
| 2002/0036080 A1 | 3/2002 | Itoh et al. | |
| 2006/0005552 A1* | 1/2006 | Anyoji et al. | 62/133 |

FOREIGN PATENT DOCUMENTS

| | | |
|---|---|---|
| DE | 103 00 261 A1 | 9/2003 |
| DE | 10 2004 009 015 A1 | 10/2004 |
| DE | 11 2007 000 754 T5 | 3/2009 |
| JP | 2000-185548 A | 7/2000 |
| JP | 2001-270322 A | 10/2001 |
| JP | 2002-174474 A | 6/2002 |
| JP | 2007-296990 A | 11/2007 |

* cited by examiner

*Primary Examiner* — Cheryl J Tyler
*Assistant Examiner* — Travis Ruby
(74) *Attorney, Agent, or Firm* — Birch, Stewart, Kolasch & Birch LLP

(57) ABSTRACT

An air-conditioning system of an electric car has an air-conditioning unit which is configured to perform air-conditioning in a passenger compartment by heater/cooler operation, a setting panel configured to set a target temperature of the passenger compartment, and a control unit which is connected to the air-conditioning unit and setting panel, and has different control of heater operation of the air-conditioning unit, wherein the control unit is configured to select controls of heater operation based on a vehicle speed v.

4 Claims, 4 Drawing Sheets

| Temperature setting dial | Setting temperatures in ordinary control (°C) | Setting temperatures in ID control (°C) |
|---|---|---|
| $P_8$ | $T_A$ | $T_G$ |
| $P_9$ | $T_B$ | $T_H$ |
| $P_{10}$ | $T_C$ | $T_I$ |
| $P_{11}$ | $T_D$ | $T_J$ |
| $P_{12}$ | $T_E$ | $T_K$ |
| $P_{13}$ | $T_F$ | $T_L$ |

AIR-CONDITIONING SYSTEM FOR ELECTRIC CAR AND METHOD OF CONTROLLING THE AIR-CONDITIONING SYSTEM

CROSS-REFERENCE TO RELATED APPLICATIONS

This application is based upon and claims the benefit of priority from prior Japanese Patent Application No. 2008-266623, filed Oct. 15, 2008, the entire contents of which are incorporated herein by reference.

BACKGROUND OF THE INVENTION

1. Field of the Invention

The present invention relates to an air-conditioning system for an electric car and a method of controlling the air-conditioning system, and in particular to temperature control in heater operation.

2. Description of the Related Art

Generally, a car is equipped with an air-conditioning system to keep the interior comfortable and windows clear. The air-conditioning system has functions of cooling, heating, dehumidifying, demisting and defrosting.

A known air-conditioning system of a car powered by an internal combustion engine uses a refrigeration cycle equipment for cooling and dehumidifying, and a heater or waste heat from the engine for heating. Thus a car powered by an internal combustion engine can use waste heat from the engine to heat the car. Jpn. Pat. Appln. KOKAI Publication No. 2000-185548 discloses an air-conditioning system for a car powered by an internal combustion engine. In the air-conditioning system, the capacity of the refrigeration cycle equipment is decreased to prevent a decrease in the temperature of airflow from outlet ports in heater operation when the waste heat from the engine is low when idling, for example.

In contrast to a car powered by an internal combustion engine, an electric car is powered by a traction motor using electrical energy supplied by a battery. The heat produced by the traction motor and battery is less than that produced by an internal combustion engine. Thus, an electric car cannot use waste heat, i.e., the heat of the traction motor to heat the car.

Therefore, an air-conditioning system of an electric car uses electrical energy stored in a battery. For example, an air-conditioning system of an electric car uses a refrigeration cycle equipment using a compressor powered by a motor, for cooling and dehumidifying. An air-conditioning system of an electric car conditions the interior of the car by heating air or water as catalyst by an electric heater, and discharging the temperature-controlled air by means of a blower.

The above air-conditioning system of an electric car has a temperature control dial in the interior of the car. An air-conditioning system of an electric car is configured to set an interior temperature by the temperature control dial. A temperature control dial is also provided in an air-conditioning system of a car powered by an internal combustion engine.

The above air-conditioning system of an electric car has the following problems. Electrical energy stored in the battery is used to power the air-conditioning system. The electrical energy is also used to power the traction motor. As the electrical energy is used for the air-conditioning system, the range of the car is decreased.

Further, heat in the interior of the car is lost by motion-induced airflow while the car is traveling. Therefore, the temperature of a heat exchange medium for heater operation of an air-conditioning system of the car is set to a temperature, so that the interior of the car can be conditioned to a target temperature even while the car is traveling. In other words, the interior of the car is set to a temperature, assuming that the heated air in the interior of the car escapes to the outside. A temperature in the interior of the car is set higher than a target temperature, assuming the escape of heated air to the outside.

In an air-conditioning system of a car powered by an internal combustion, the rotational speed of the internal combustion engine is decreased when idling. Heater output is reduced during idling, even if the temperature setting of the heater stays the same. Therefore, the air-conditioning system of a car powered by an internal combustion engine performs appropriate air-conditioning according to whether the engine is doing work or idling, assuming a decrease in passenger compartment temperature caused by the reduction of heater output during idling.

However, as an electric car is powered by the electrical energy of a battery, the air-conditioning system of the electric car can perform heater operation at a high temperature setting, assuming the escape of heat inside the car by motion-induced airflow even at idling. In other words, the air-conditioning system of an electric car always performs constant heater operation in either during running or at idling.

Therefore, in an electric car equipped with an air-conditioning system, the passenger compartment temperature at idling is higher than that when the motor is doing work. As heater operation is performed at a temperature setting for running even at idling, a passenger compartment temperature at idling is higher than a target temperature. Thus, unnecessary air-conditioning is performed, and the battery energy is wasted. In particular, an air-conditioning system of an electric car uses battery energy, and unnecessary air-conditioning decreases a running distance, and wastes electric energy.

SUMMARY OF THE INVENTION

To solve the above problems and achieve an objective, an air-conditioning system of an electric car and a method of controlling an air-conditioning system according to the invention are configured as follows.

According to an aspect of the invention, there is provided an air-conditioning system of an electric car comprising a secondary battery installed in the car; an air-conditioning unit which is configured to heat and cool a resident space (passenger compartment) in the car by the electrical power supplied from the secondary battery, and is operated based on temperature setting of a heat exchange medium configured to adjust passenger compartment temperature of the resident space to a target passenger compartment temperature; a setting unit configured to optionally set the target passenger compartment temperature; and a control unit which has groups of setting temperatures of the air-conditioning unit, i.e., a combination of setting temperatures for target passenger compartment temperatures set in the setting unit during a heater operation of the air-conditioning unit, and is configured to select one of the groups of setting temperatures according to a travel state of the car, and to perform heater operation of the air-conditioning unit based on the selected group of setting temperatures, wherein in the groups of setting temperatures, at least some setting temperatures of the combination are set to different temperatures.

According to another aspect of the invention, there is provided a method of controlling an air conditioning system which is operated by the electrical power supplied from a secondary battery installed in a car based on temperature setting of a heat exchange medium configured to adjust the passenger compartment temperature to a target passenger compartment temperature, comprising a step of setting the passenger compartment temperature to an optional target temperature; a step of determining a travel state of the car according to a delay in a vehicle speed of the car; a step of selecting one of groups of setting temperatures of an air-conditioning unit, i.e., a combination of setting temperatures for target passenger compartment temperatures set in a setting unit during a heater operation of the air-conditioning unit, in which at least some setting temperatures of the combination are set to different temperatures, according to a delay in the vehicle speed; and a step of performing heater operation of the air-conditioning unit based on the setting temperatures of the selected group.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, an explanation will be given of an electric car 1 having an air-conditioning system 10 according to an embodiment of the invention with reference to FIGS. 1 to 4.

Figure 1:
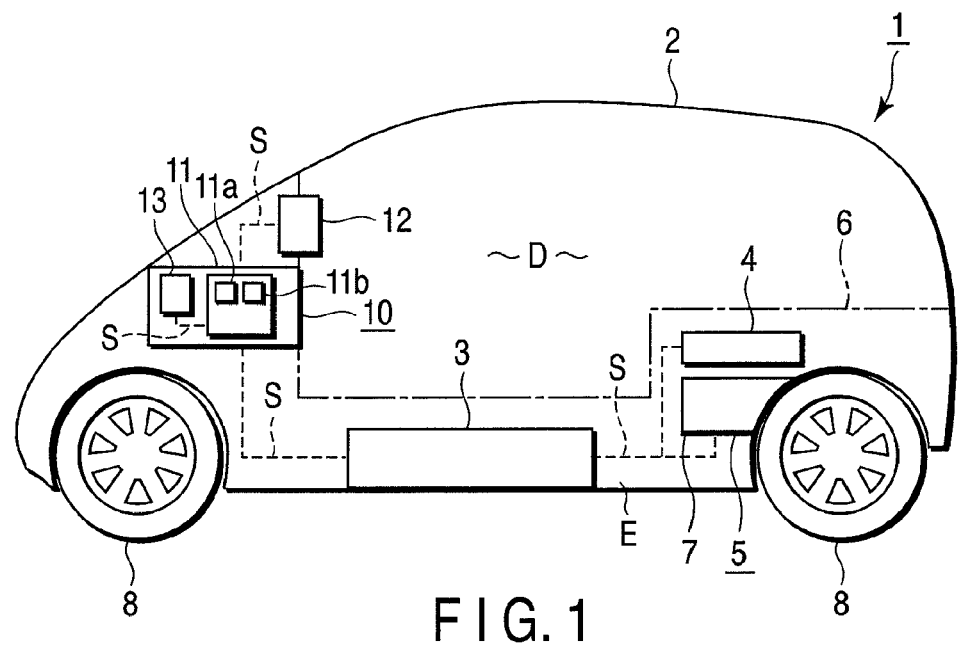
FIG. 1 is an explanation diagram showing a configuration of an electric car using an air-conditioning system according to an embodiment of the invention.
Figure 6:
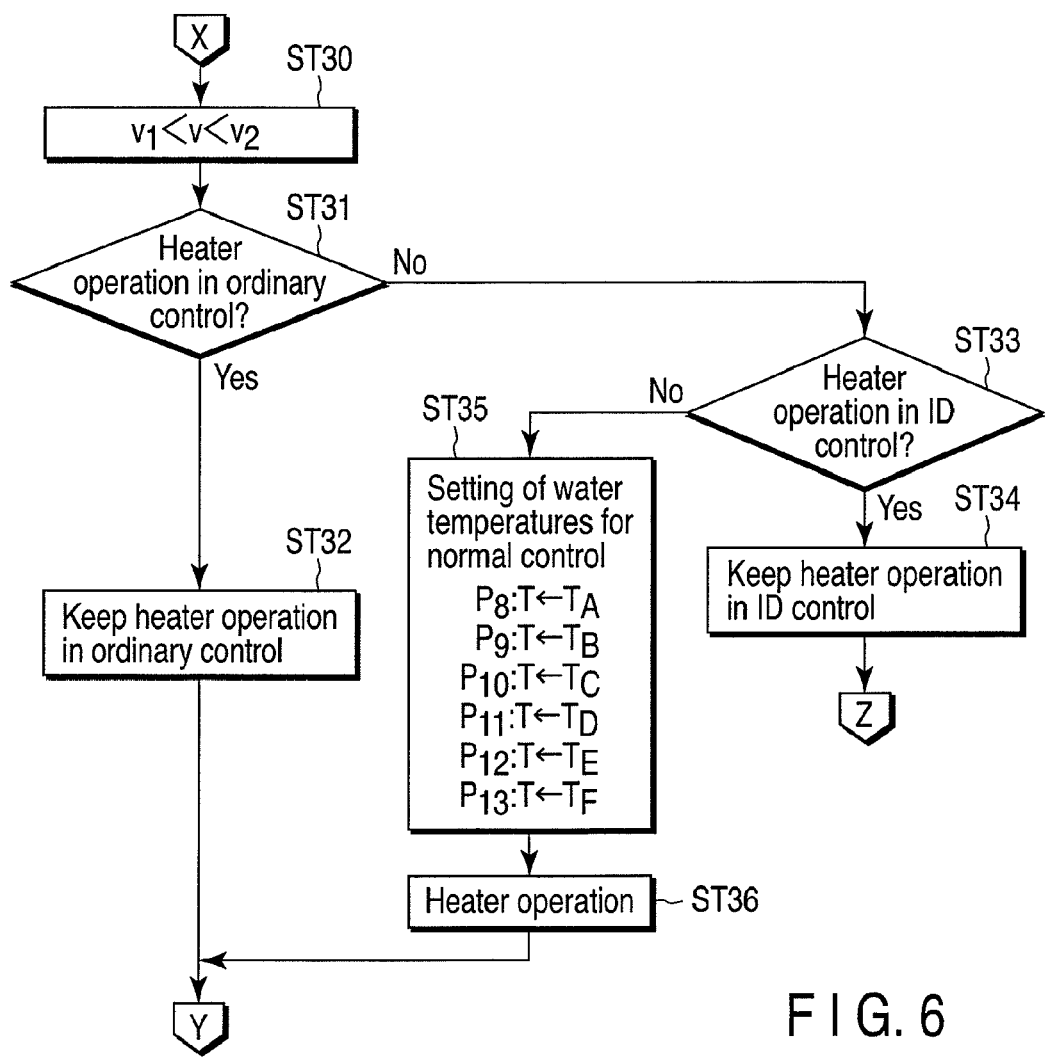
FIG. 6 is a flowchart showing a part of the control of operations of the air-conditioning system.
Figure 2:
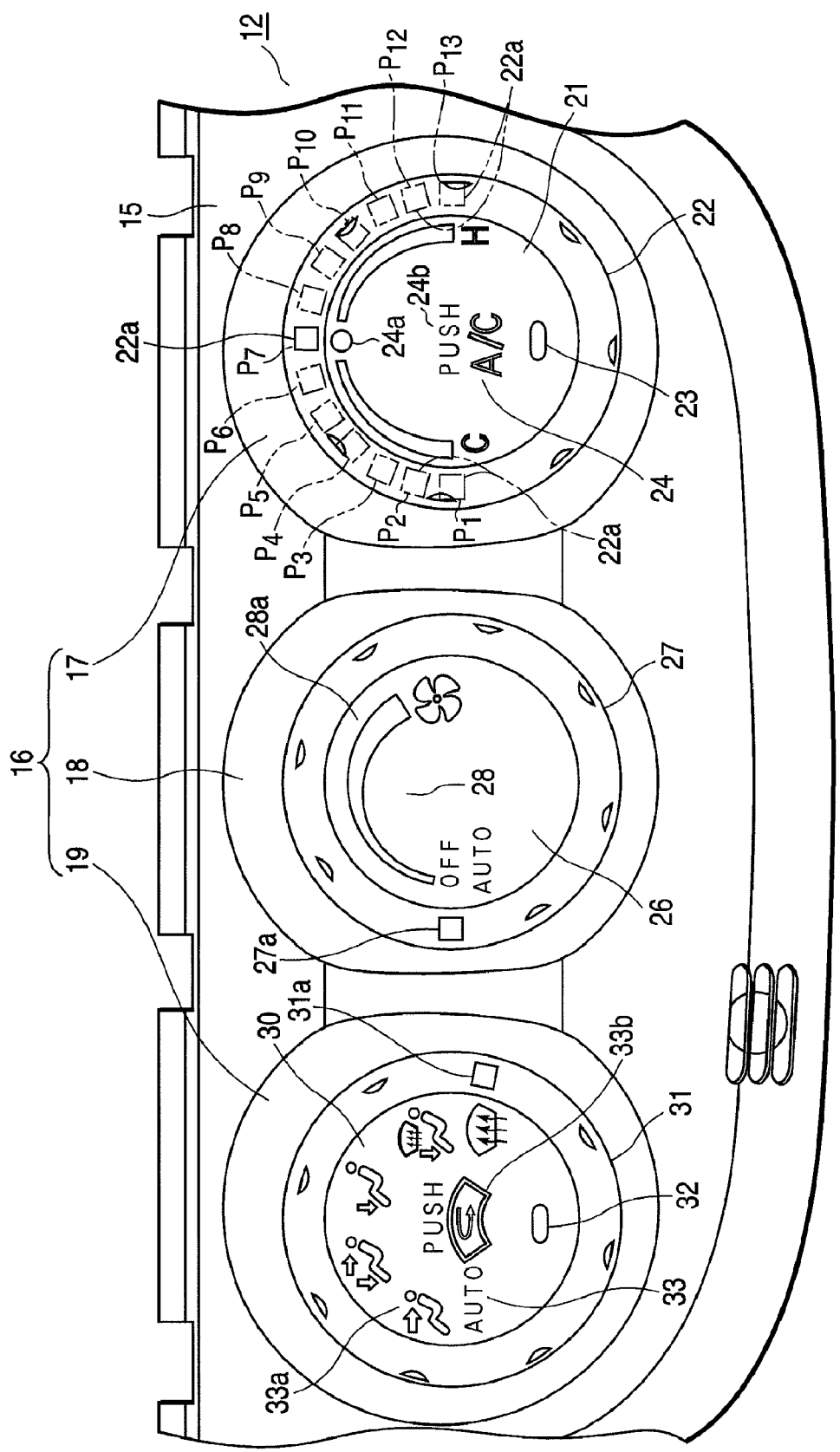
FIG. 2 is a front view showing a configuration of a setting panel of the air-conditioning system.
Figures 3, 4:
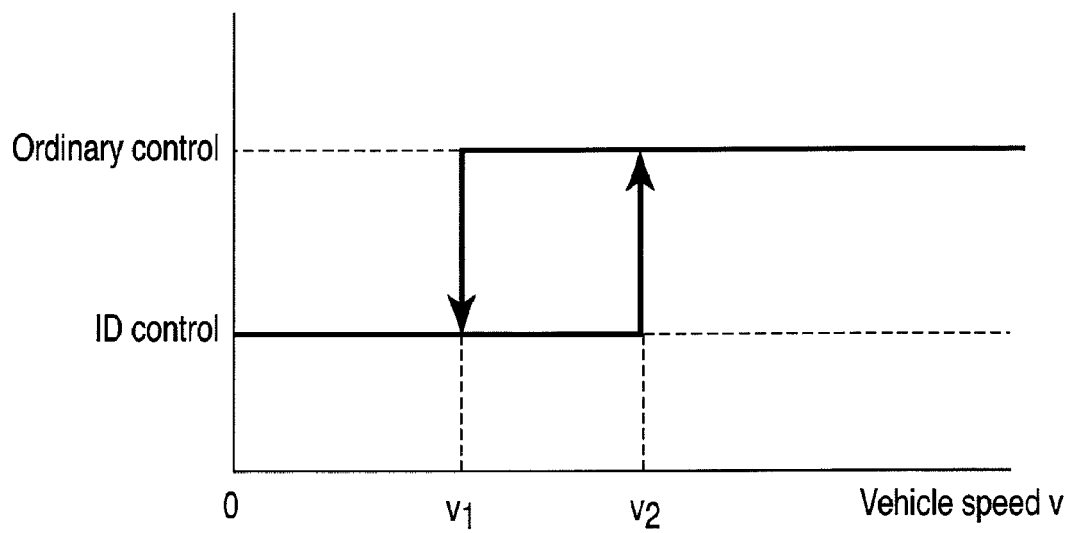
FIG. 3 is a graph showing an example of control of the air-conditioning system.
FIG. 4 is a table showing an example of setting temperatures in the air-conditioning system.
Figure 5:
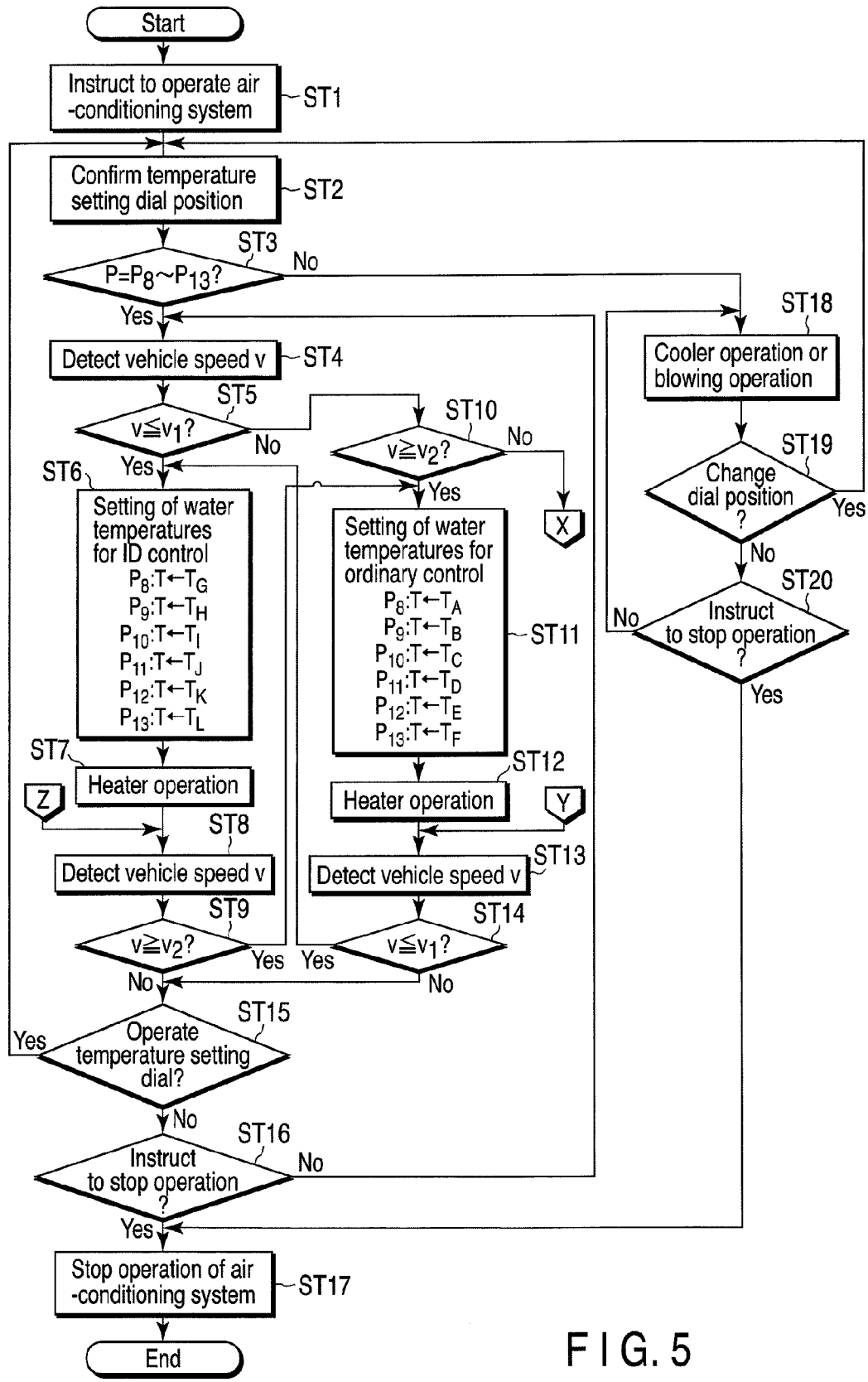
FIG. 5 is a flowchart showing control of operations of the air-conditioning system.

FIG. 1 is an explanation diagram showing a configuration of an electric car (vehicle) 1 using an air-conditioning system 10 according to an embodiment of the invention. FIG. 2 is a front view showing a configuration of a setting panel 12 of the air-conditioning system 10. FIG. 3 is a graph explaining an example of control by the air-conditioning system 10. FIG. 4 is a table shows an example of setting temperatures in the air-conditioning system 10. FIG. 5 is a flowchart showing control of operations of the air-conditioning system 10. FIG. 6 is a flowchart showing a part of the control of operations of the air-conditioning system 10. In FIG. 1, D denotes a passenger compartment, E denotes a machinery compartment, and S denotes electrical wiring.

As shown in FIG. 1, the electric car 1 has a vehicle main body (car body) 2, a battery 3, a recharger 4, a driving mechanism 5, and an air-conditioning system 10. In addition to the car body 2, battery 3, i.e., a secondary battery, recharger 4, driving mechanism 5, and air-conditioning system 10, the electric car 1 is provided with other components such as an EV-ECU and a steering mechanism. An explanation thereof will be omitted.

The car body 2 has a passenger compartment D, i.e., an interior space, in which a driver and passengers are seated, and baggage is loaded, and a machinery compartment E, in which the battery 3, driving mechanism 5, air-conditioning system 10, and other components of the electric car 1 are housed or installed. In the car body 2, the passenger compartment D and machinery compartment E are parted by a partition 6. The partition 6 consists of two or more members such as a floor panel and dash panel.

The battery 3 comprises a large-capacity lithium ion battery, for example. The battery 3 is connected to the recharger 4, driving mechanism 5, air-conditioning system 10, and other components through a CAN-c CAN cable (electrical wiring) S. The battery 3 is composed to supply electric power to the driving mechanism 5 and air-conditioning system 10 through the electrical wiring S.

The recharger 4 has an inverter to convert AC voltage input from a wall socket into DC voltage for charging the battery 3. The recharger 4 is configured to be connectable to various power supplies outside the car body 2 other than a wall socket.

The driving mechanism 5 is connected to the battery 3 by the electrical wiring S. The driving mechanism 5 has a motor 7 and a driving wheel 8. For example, the motor 7 is configured to be electrically powered by the battery 3, when receiving a driving instruction. The driving wheels 8 are configured to be driven by the motor 7. The driving mechanism 5 is configured to detect a vehicle speed v of the electric car 1 during travel, from a rotational speed of the driving wheel 8.

The air-conditioning system 10 comprises an air-conditioning unit 11 able to perform air-conditioning of the passenger compartment D by heater operation and cooler operation, a setting panel 12 for various setting for air-conditioning operation, and a control unit 13 for the air-conditioning system 10 connected to the air-conditioning unit 11 and setting panel 12. The air-conditioning system 10 is operated by electrical energy of the battery 3.

The air-conditioning system 10 has outlet ports to blow out conditioned air to the passenger compartment D. The blowout ports include an outlet port to blow out air to the passengers' feet, an outlet port to blow out air to the passengers' bodies, and an outlet port to blow out air to the windows (defroster).

The air-conditioning unit 11 is provided with a refrigeration cycle unit 11a using a heat pump to drive a compressor by a compressor-driving motor in cooler/dehumidifier operation, and an electric water heater 11b to heat water in heater operation, for example. For convenience of explanation, the refrigeration cycle unit 11a is called referred to an air-conditioner or A/C in some parts of the following explanation. The air-conditioning unit 11 has a blower (fan), which blows out air cooled by the refrigeration cycle unit 11a, and air heated by hot water to the passenger compartment D from the outlet ports. The configuration of the air-conditioning unit 11 is not limited to this. A setting temperature is set for the heat exchange medium of the air-conditioning unit 11. For example, a setting temperature is a temperature of the electric water heater 11b, which heats water to achieve a target passenger compartment temperature.

As shown in FIG. 2, the setting panel 12 is configured to partially project from the partition 6 into the passenger compartment D. As a part of the setting panel 12 is projected from the partition 6 into the passenger compartment D, the setting panel is arranged in the car body 2 operably from the passenger compartment D. The setting panel 12 has a decorated panel (panel) 15 forming a part of the partition 6, to prevent the machinery compartment E and electrical wiring S from being exposed to the passenger compartment D. The panel 15 is formed fixable to the partition 6 by using claws.

The setting panel 12 has setting dials 16 on the panel 15. The setting dials 16 include the temperature setting part 17, fan setting part 18, and outlet selector part 19. The control unit 13 is electrically connected to the temperature setting part 17, fan setting part 18, and outlet selector part 19 on the setting panel 12, through the electrical wiring S.

The temperature setting part 17 is configured to set a desired target temperature. The temperature setting part 17 has an air-conditioner switch 21 and a temperature control dial 22. For example, the air-conditioner switch 21 is made in the form of a disc, and the temperature control dial 22 is made in the form of a ring. In the temperature setting part 17, the temperature control dial 22 is rotatable around the air-conditioner switch 21 at predetermined angles.

The air-conditioner switch 21 is configured to turn on/off the air-conditioner 11a, i.e., selecting operation modes of the air-conditioner 11a. The air-conditioner switch 21 is configured to transmit the operating information about the air-conditioner switch 21 to the control unit 13 through the electrical wiring S. The air-conditioner switch 21 has on the surface an A/C indicator means 23 to indicate on/off of the air-conditioner 11a, and a first guide display 24 to show the operations of the air-conditioner switch 21 and temperature control dial 22.

The A/C indicator means 23 is configured to light to indicate that the air-conditioner 11a is turned on, when the air-conditioner switch 21 is pressed and the air-conditioner 11a is turned on. In other words, when the air-conditioner switch 21 is pressed once, the A/C indicator means 23 lights to indicate the turning-on of the air-conditioner 11a. When the air-conditioner switch 21 is pressed again in this state, the A/C indicator means turns off and indicates the turning-off of the air-conditioner 11a.

The first guide display 24 has a temperature guide display 24a, which is provided by printing in the upper half and at the outer periphery of the air-conditioner switch 21, and shows the positions of the temperature control dial, approximate temperatures, or a target temperature. The first guide display 24 has an A/C operation guide display 24b, which is provided by printing at about the center of the air-conditioner switch 21, and shows the operations of the air-conditioner switch 21.

The temperature guide display 24a is configured so that approximate setting of cooling/heating temperatures can be seen at the positions where the temperature control dial 22 is rotated. In particular, the temperature guide display 24a is divided into the left-side cooler part and right-side heater part, from the top position of the air-conditioner switch 21. The heater part is indicated by "H"; the cooler part, by "C". The heater part and cooler part are indicated by arcs, separating at the top position of the temperature guide display 24a, and increasing the width gradually from the top position to the position about 90° from the top position.

The A/C operation guide display 24b is indicated by "PUSH A/C", for example. The A/C operation guide display 24b shows that the air-conditioner switch 21 can be operated by pressing the switch.

The temperature control dial 22 has a first position mark 22a to indicate a rotation position. The temperature control dial 22 is configured to rotate about 180° around the air-conditioner switch 21, for example. In other words, the temperature control dial 22 is configured to rotate so that the first position mark 22a is moved about 90° in the left and right directions from the top position of the air-conditioner switch 21.

The temperature control dial 22 is configured to set a temperature of the passenger compartment D to a desired target temperature. The temperature control dial 22 is configured to produce a little resistance when it is rotated by a predetermined angle, thereby the first position mark 22a can be moved to a position P, i.e., a predetermined rotation position. The temperature control dial 22 has a plurality of position P.

For example, the temperature control dial 22 has a position P1, at which the temperature of the passenger compartment D becomes the lowest, i.e., a target temperature in cooler operation. The temperature control dial 22 has a position P13, at which the temperature of the passenger compartment D becomes the highest, i.e., a target temperature in heater operation.

The temperature control dial 22 has equally divided positions between the positions P1 and P13. Namely, the temperature control dial 22 has positions P1 to P13. The first position mark 22a indicated by a solid line and two-dot chain line in FIG. 2 includes the positions P1 to P13. The temperature control dial 22 is configured to transmit the information about the position P to the control unit 13 through the electrical wiring S.

The temperature control dial 22 is configured to be rotatable to the positions P1 to P6 corresponding to desired target temperatures in cooler operation, so that the controller 13 described later can set the temperatures of the air blow out from the outlet port. Similarly, the temperature control dial 22 is configured be rotatable to the positions P8 to P13 corresponding to desired target temperatures in heater operation, so that the controller 13 can set the temperatures of the air blow out from the outlet port.

The fan setting part 18 has a fan setting guide 26, and a fan setting dial 27. For example, the fan setting guide 26 is made in the form of a disc, and the fan setting dial 27 is made in the form of a ring. In the fan setting part 18, the fan setting dial 27 is rotatable around the fan setting guide 26 by predetermined angles.

The fan setting part 18 is configured to set the airflow from the fan to OFF, or steps from weak to strong, according to the rotated positions. The fan setting part 18 is configured to set the operation (AUTO), in which the airflow is automatically set according to the temperature of the passenger compartment D. The rotated positions of the fan setting part 18 are detected by the controller 13 described later. According to the detection result, the control unit 13 operates the fan. In the AUTO operation, the control unit 13 operates the fan according to a predetermined airflow of the fan for the temperature of the passenger compartment D, for example. A detailed explanation thereof is omitted.

The fan setting guide 26 has a second guide display 28 to show the operations of the fan setting dial 27. The second guide display 28 has a fan setting guide display 28a, which is provided by printing in substantially the upper half and at the outer periphery of the fan setting guide 26, and shows the positions of the fan setting dial 27, and setting of the fan.

The fan setting guide display 28a is configured so that approximate airflow setting of the fan can be seen at a position where the fan setting dial 27 is set. In particular, the fan setting guide display 28a is started from the periphery in substantially the left end portion of the fan setting guide 26 (at the position of about 270° counterclockwise from the top position) to the right end portion (the position of about 90° from the top position), i.e., the symmetrical position across the top position. "OFF" is indicated in the left end portion. The fan setting guide display 28a has an arc-shaped part indicating the airflow from the fan, whose width is gradually increased from the OFF position to the right end. In the fan setting guide display 28*a*, "AUTO" is indicated under "OFF".

The fan setting dial 27 has a second position mark 27*a* to indicate a rotation position. The fan setting dial 27 is configured to rotate around the fan setting guide 26 by predetermined angles, for example. The fan setting dial 27 is configured to rotate around the fan setting guide 26 in a range, in which the second position mark 27*a* is moved within the range of the fan setting guide display 28*a*.

The fan setting dial 27 is configured to produce a little resistance when it is rotated between the OFF and AUTO positions of the fan setting guide display 28*a*, and between the OFF position and the arc indicating the airflow from the fan. The fan setting dial 27 is configured so that the second position mark 27*a* is moved to predetermined rotation positions by this resistance. The fan setting dial 27 is configured to transmit the information about the positions to the control unit 13 through the electrical wiring S.

The outlet selector part 19 has an internal/external air selector switch 30, and an outlet port selector dial 31. The internal/external air selector switch 30 is made in the form of a plate. The outlet port selector dial 31 is made in the form of a circle. The outlet selector part 19 is configured so that the outlet port selector dial 31 is rotated around the internal/external air selector switch 30 by predetermined angles.

The internal/external air selector switch 30 is configured to set air-intake to internal or external by pressing. When the internal/external air selector switch 30 is pressed and turn on, internal air circulation is selected. When the internal/external air selector switch 30 is pressed, the information about the depression of the internal/external air selector switch 30 is transmitted to the control unit 13 through the electrical wiring S.

The internal/external air selector switch 30 has on its surface an internal/external air indicator means 32 to indicate on/off of the internal/external air selector, and a third guide display 33 to show the operations of the internal/external air selector switch 30 and outlet port selector dial 31.

The internal/external air indicator means 32 is configured to light to indicate internal air circulation, when the internal/external selector switch 30 is pressed and turned on. In other words, when the internal/external selector switch 30 is pressed, the internal/external air indicator means 32 lights to indicate internal air circulation. When the internal/external selector switch 30 is pressed again in this state, the internal/external air indicator means 32 goes out to indicate external air circulation.

The third guide display 33 has an outlet port guide display 33*a*, which is provided by printing and starting from substantially the left end portion of the internal/external air selector switch 30 to the right end portion across the top position. The third guide display 33 has an internal/external air operation guide display 33*b*, which is provided by printing at about the center of the internal/external air selector switch 30, and shows the operations of the internal/external air selector switch 30.

The outlet port guide display 33*a* is configured so that the outlet port to blow out conditioned air can be seen. For example, the outlet guide display 33*a* has of the legend "AUTO", and icons indicating a passenger body, passenger body and feet, passenger feet, passenger feet and defroster, and defroster, from the left end to the right.

The internal/external air operation guide display 33*b* has of the legend "PUSH" and an icon indicating internal air circulation, for example, indicating that the internal/external selector switch 30 is operated by pressing. The internal/external air indicator means 32 is provided under the mark indicating internal air circulation. Therefore, when the internal/external air indicator means 32 is lit, the internal/external air selector switch 30 indicates internal air circulation.

The outlet port selector dial 31 has a third position mark 31*a* to indicate a rotation position. The outlet port selector dial 31 is configured to rotate around the internal/external air selector switch 30 by predetermined angles. The outlet port selector dial 31 is configured so that the third position mark 31*a* is moved around the internal/external air selector switch 30 corresponding to the internal/external air indicator means 33*a*.

The outlet port selector dial 31 is configured to produce a little resistance when it is moved to AUTO, and marks indicating a passenger body, passenger body and feet, passenger feet, passenger feet and defroster, and defroster. By the resistance, the third position mark 31*a* of the outlet port selector dial 31 is movable to a predetermined position.

The control unit 13 is configured to receive the positions of the temperature setting part 17, fan setting part 18 and outlet selector part 19, and signals whose voltages are different according to operations and setting states. The control unit 13 is configured to recognize the setting states of the setting panel 12, based on the signals from the setting panel 12.

The control unit 13 has groups of setting temperatures, as operating conditions of the air-conditioning unit 11 previously set based on the setting states of the setting panel 12. In this embodiment, as groups of setting temperatures, combination of two groups of setting temperatures indicated in the setting temperature table of FIG. 4 will be explained. The setting temperatures of the group indicates the temperatures of the heat exchange medium of the air-conditioning unit 11, i.e., the setting temperatures of the electric water heater 11*b*.

The control unit 13 is configured to select a setting temperature based on the travel state of the electric car 1. The control unit 13 is configured to operate the electric water heater 11*b* of the air-conditioning unit 11, based on setting temperatures corresponding to the positions of the temperature control dial 22, among the selected group of setting temperatures. The control unit 13 is configured to receive and recognize a vehicle speed detected by the driving mechanism 5.

The control unit 13 changes a target passenger compartment temperature of the passenger compartment D based on the positions P1 to P6 of the temperature control dial 22. The control unit 13 controls an air-conditioner 11*a* of the air-conditioning unit 11 so that the passenger compartment temperature of the passenger compartment D reaches the target passenger compartment temperature, and operates the air-conditioning unit 11. The control unit 13 operates the air-conditioner 11*a* when the air-conditioner switch 21 is turned on, but operates only the fan of the air-conditioning unit 11 to discharge air when the air-conditioner switch 21 is turned off.

The control unit 13 changes a target passenger compartment temperature of the passenger compartment D based on the positions P8 to P13 of the temperature control dial 22. The control unit 13 controls temperature setting of the electric water heater 11*b* of the air-conditioning unit 11 so that the passenger compartment temperature of the passenger compartment D reaches the target passenger compartment temperature, and operates the air-conditioning unit 11.

The control unit 13 blows out conditioned air from the outlet port selected in the outlet selector part 19 according to the airflow volume of the fan set in the fan setting part 18.

In particular, the control unit 13 has at least following functions (1) to (4) as functions to control air-conditioning.

(1) A cooling temperature control function to control a temperature in cooler operation of the air-conditioning system 10 based on a target passenger compartment temperature set in the temperature setting part 17.

(2) A heating temperature control function to control a temperature in heater operation of the air-conditioning system 10 based on a vehicle speed v and a target passenger compartment temperature set in the temperature setting part 17.

(3) An airflow control function to control airflow of the air-conditioning system 10 based on airflow set in the fan setting part 18.

(4) An outlet port control function to select an outlet port of the air-conditioning system 10 based on an outlet port set in the outlet selector part 19.

The above four functions of the control unit 13 will be explained.

(1) The cooling temperature control function of the control unit 13 is used to operate the air-conditioning unit 11 by changing the power consumption of the compressor of the refrigeration cycle unit 11a, according to the positions P1 to P6 of the first position mark 22a of the temperature control dial 22. By the cooling temperature control function, the control unit 13 controls the compressor of the refrigeration cycle unit 11a provided in the air-conditioning unit 11 to a blowout air temperature set by the temperature control dial 22, and performs cooler operation. The setting such as rotation speed of the operation control of the refrigeration cycle equipment for the position P can be changed depending on the form and material of the car body 2, and the capacity of the air-conditioning system 10. Detailed setting values thereof are omitted.

(2) The heating temperature control function of the control unit 13 is used to set a temperature of the electric water heater 11b to a predetermined temperature to blow out the heat of the hot water to the inside of a car, according to the positions P8 to P13 of the first position mark 22a of the temperature control dial 22. The heating temperature control function changes the control of the air-conditioning unit 11 based on a delay in the vehicle speed v while the electric car 1 is traveling, for example, as shown in FIG. 3. In other words, the control unit 13 determines a travel state of the electric car 1 based on a delay in a vehicle speed v, and selects a group of temperatures, in which the air-conditioning unit 11 can increase a passenger compartment temperature to an appropriate temperature, based on the determined travel state.

For example, as a heating temperature control function, when a vehicle speed is a predetermined v1, the control unit 13 controls idling (ID) as a control of heater operation. When a vehicle speed is a predetermined v2, the control unit 13 performs ordinary control.

The vehicle speed v1 may be a speed, at which a passenger compartment temperature of the passenger compartment D is lowered a little when idling or by the influence of external air such as motion-induced airflow. The vehicle speed v1, at which the passenger compartment temperature of the passenger compartment D is lowered a little when idling or by the influence of external air such as motion-induced airflow, is different depending on the form and material of the car body 2. A detailed explanation thereof is omitted.

The vehicle speed v2 may be a speed, at which a predetermined passenger compartment temperature of the passenger compartment D is lowered by external air such as motion-induced airflow. The vehicle speed v2, at which a predetermined passenger compartment temperature of the passenger compartment D is lowered by the influence of external air such as motion-induced airflow, is different depending on the form and material of the car body 2. A detailed explanation thereof is omitted.

The vehicle speeds v1 and v2, which are the reference for selection of ordinary control and ID control for which setting temperatures are selected, are changeable depending on the form and material of the car body 2, and the capacity of the air-conditioning system 10. Specific values thereof are not defined here. The vehicle speed v1 is slower than the vehicle speed v2 (v1<v2).

Namely, when the vehicle speed $v \geq v2$ as shown in FIG. 3, the control unit 13 performs heater operation in ordinary control. When the vehicle speed $v \leq v1$, the control unit 13 performs heater operation in ID control. When the vehicle speed v is changed to $v \leq v1$ during heater operation in ordinary control, the control unit 13 changes the control of the air-conditioning system 10 from ordinary control to ID control, and continues the heater operation. When the vehicle speed v is changed to $v \geq v2$ during heater operation in ID control, the control unit 13 changes the control of the air-conditioning system 10 from ID control to ordinary control, and continues the heater operation.

Further, as shown in FIG. 4, the control unit 13 has a table of setting temperatures of the electric water heater 11b for heater operation, based on the positions of the temperature control dial 22, and a vehicle speed v. The table of setting temperatures for heater operation includes two groups of setting temperatures. Here, the setting temperatures of the electric water heater 11b in ordinary control are set to $T_A$ to $T_F$ (° C.) for the positions P8 to P13. These temperatures $T_A$ to $T_F$ (° C.) constitute a group of setting temperatures in ordinary control. The setting temperatures are the temperatures of the electric water heater 11b, at which a passenger compartment temperature of the passenger compartment D can be increased to a target passenger compartment temperature, but any other temperatures such as hot water temperature may be used, as long as it can achieve a target passenger compartment temperature.

Next, an explanation will be given of the relationship between the temperatures $T_A$ to $T_F$ of the electric water heater 11b.

The temperatures $T_A$ to $T_F$ of the electric water heater 11b are set to $T_A<T_B<T_C<T_D<T_E<T_F$ in ordinary control. Further, for example, the temperatures $T_B$ to $T_F$ are set by sequentially adding a predetermined temperature α° C. to $T_A$: $T_B=T_A+\alpha$, $T_C=T_B+\alpha$, $T_D=T_C+\alpha$, $T_E=T_D+\alpha$, and $T_F=T_E+\alpha$. The predetermined temperature α° C. is optional. The predetermined temperature α° C. in each temperature may be different.

In ID control, the temperatures of the electric water heater 11b are set to $T_G$ to $T_L$ (° C.) for the positions P8 to P13. The temperatures $T_G$ to $T_L$ (° C.) are the setting temperatures in ID control. The temperatures $T_G$ to $T_L$ of the electric water heater 11b are set to $T_G=T_H$, and $T_G$ $(T_H)<T_I<T_J<T_K<T_L$ in ID control, for example. The temperatures $T_I$ to $T_L$ (or $T_H$) are set by sequentially adding a predetermined temperature α° C. to $T_G$ $(T_H)$: $T_I=T_G+\alpha$, $T_J=T_I+\alpha$, $T_K=T_J+\alpha$, and $T_L=T_K+\alpha$.

In the ordinary control and ID control, the temperatures of the electric water heater 11b are set to $T_A=T_G=T_H$. At the position P8, the setting temperature of the electric water heater 11b is set to the same for both ordinary control and ID control. In ID control, the temperature of the electric water heater 11b at the position P9 is set to the same as the temperature at the position P8. In the ordinary control and ID control, the temperature of the electric water heater 11b in ordinary control is set α (α° C.) higher than the temperature in ID control at the position P13. In other words, in the group of setting temperatures for ID control, some temperatures are set lower than those for ordinary control.

By the heating temperature control function, the control unit 13 selects ordinary control and ID control based on a vehicle speed v, controls the electric water heater 11*b* according to the positions of the temperature control dial of the temperature setting part 17, and performs the heater operation.

(3) The airflow control function of the control unit 13 controls the rotational speed of the fan, and changes the airflow from the outlet port, according to the positions of the fan setting dial 27. When the position mark 27*a* of the fan setting dial 27 is set to the AUTO position, the control unit 13 compares the temperature of the passenger compartment D with a target temperature, and controls the airflow of the fan depending on the difference between the passenger compartment temperature and target passenger compartment temperature. The airflow control function of the control unit 13 controls the airflow of the air-conditioning system 10 according to the positions of the fan setting dial 27.

(4) The outlet port control function of the control unit 13 opens an outlet port to blow out conditioned air according to the positions of the outlet port selector dial 31. When the third position mark 31*a* of the outlet port selector dial 31 is set to the AUTO position, the control unit 13 selects the selected outlet port according to a passenger compartment temperature of the passenger compartment D. The outlet port control function of the control unit 13 selects an outlet port according to the positions of the outlet port selector dial 31.

Next, an example of the operation of the air-conditioning system 10 is explained with reference to the flowcharts of FIGS. 5 and 6.

First, as step ST 1, a driver instructs operation of the air-conditioning system 10 by operating the setting panel 12. The control unit 13 detects the setting of the setting panel 12 by the driver. When the second position mark 27*a* of the fan setting dial 27 is set to any position other than the OFF position, the control unit 13 detects it, and starts the air-conditioning unit 11. As the air-conditioning unit 11 is started, the fan is started, and the air-conditioning system 10 is started.

By the airflow control function and outlet port control function, the control unit 13 determines the airflow of the fan, and the outlet port of the air, according to the detected positions of the fan setting dial 27 and outlet selector dial 31 on the setting panel 12. Next, as step ST 2, the control unit 13 detects the position of the temperature control dial 22. Then, as step ST 3, the control unit 13 determines whether the detected position of the temperature control dial 22 is any one of the positions P8 to P13, at which the heating temperature control function is performed.

When the detected position of the temperature control dial 22 is any one of P8 to P13 (step ST 3), the control unit 13 detects a vehicle speed v, as step ST 4.

Next, as step ST 5, the control unit 13 determines whether the detected vehicle speed v is the same as or slower than a predetermined vehicle speed v1. When the detected vehicle speed v is the same as or slower than the vehicle speed v1 (YES in step ST 5), the control unit 13 selects ID control for heater operation, and sets a temperature of the electric water heater 11*b* by selecting a temperature from the group of setting temperatures for ID control. At this time, the temperature T of the electric water heater 11*b* is set to T=$T_G$ when the detected position is P8, likewise, T=$T_H$ for the position P9, T=$T_I$ for the position P10, T=$T_J$ for the position P11, T=$T_K$ for the position P12, and T=$T_L$ for the position P13.

After setting the temperature T of the electric water heater 11*b*, the control unit 13 performs the heater operation in ID control, as step ST 7. In the heater operation, the control unit 13 heats water by the electric water heater 11*b* based on the set temperature, heats the air from the fan by the heated water, blows out the heated air from the outlet port, and warms up the passenger compartment D.

The control unit 13 performs the heater operation in ID control, and detects a vehicle speed v again, as step ST 8. As step ST 9, the control unit 13 determines whether the detected vehicle speed v is a speed to change the ID control to ordinary control (vehicle speed v≧v2). When the detected vehicle speed v is slower than the predetermined vehicle speed v2 (NO in step ST 9), the control unit 13 continues the heater operation in ID control.

Next, an explanation is given of the case in which the vehicle speed v detected in step ST 4 is slower than a predetermined vehicle speed V1 (NO in step ST 5). In this case, as step ST 10, the control unit 13 determines whether the vehicle speed v is the same as or faster than the vehicle speed v2. When the vehicle speed v is the same as or faster than the predetermined vehicle speed v2 (YES in step ST 10), the control unit 13 selects ordinary control for heater operation, and sets a temperature of the electric water heater 11*b*, as step ST 11. At this time, the temperature T of the electric water heater 11*b* is set to T=$T_A$ when the position P8 is selected, likewise, T=$T_B$ for the position P9, T=$T_C$ for the position P10, T=$T_D$ for the position P11, T=$T_E$ for the position P12 is selected, ad T=$T_F$ for the position P13.

After setting the temperature T of the electric water heater 11*b*, the control unit 13 performs heater operation in ordinary control, as step ST 12. In the heater operation, the control unit 13 heats water by the electric water heater 11*b* based on the set temperature, heats the air from the fan by the heated water, and blows out heated air from the outlet port, and wars up the passenger compartment D.

Next, the control unit 13 performs the heater operation in ordinary control, and detects a vehicle speed v again, as step ST 13. As step ST 14, the control unit 13 determines whether the detected vehicle speed v is a speed to change the ordinary control to ID control (vehicle speed v≦v1). When the detected vehicle speed v is faster than the predetermined vehicle speed v1 (NO in step ST 14), the heater operation in ordinary control is continued.

When NO in steps ST 9 and ST 14, the control unit 13 continues heater operation, and determines whether a driver rotates the temperature control dial 22, as step ST 15.

If a driver does not rotate the temperature control dial 22 (NO in step ST 15), the control unit 13 determines whether a driver instructs to stop the operation, i.e., a driver rotates the fan setting dial 27 to the OFF position, as step ST 16. If a driver rotates the fan setting dial 27 to the OFF position and stops the heater operation (YES in step ST 16), the control unit 13 stops the operation of the air-conditioning system 10, as step ST 17. If a driver does not instruct to stop the operation in step ST 16 (NO in step ST 16), the control unit 13 returns to step ST 4, and detects a vehicle speed v again. Thereafter, steps at and after ST 5 are repeated.

If a driver rotates the temperature control dial 22, and the position P is changed in step ST 15 (YES in step ST 15), the control unit 13 returns to step ST 2, and confirms the position of the temperature control dial 22. Thereafter, steps at and after ST 3 are repeated.

If the vehicle speed v detected in step ST 8 is the same as or faster than the vehicle speed v2 (YES in step ST 9), the control 13 returns to step ST 11, sets a temperature for ordinary control, and performs heater operation. Thereafter, steps at and after ST 12 are repeated.

If the vehicle speed v detected in step ST 13 is the same as or slower than the vehicle speed v1 (YES in step ST 14), the control 13 returns to step ST 6, sets a temperature for ID control, and performs heater operation. Thereafter, steps at and after ST 7 are repeated.

Next, an explanation is given of the case in which the vehicle speed v detected in step ST 4 is faster than a predetermined vehicle speed V1 (NO in step ST 5), and slower than the predetermined vehicle speed v2 (NO in step ST 10).

When the vehicle speed v detected in step ST 4 is faster than a predetermined vehicle speed V1 (NO in step ST 5), and slower than the predetermined vehicle speed v2 (NO in step ST 10) (v1<v<v2), the steps of the flowchart X in FIG. 6 are executed. As shown in step ST 30 in FIG. 6, when the vehicle speed v detected in step ST 4 is faster than the vehicle speed v1 and slower than the vehicle speed v2, the control unit 13 determines whether the operation is heater operation in ordinary control or not, as step ST 31.

If the operation is heater operation in ordinary control (YES in step ST 31), the control unit 13 performs heater operation in ordinary control, and goes to Y in FIG. 5, and detects a vehicle speed v, as step ST 13. Thereafter, steps at and after ST 14 are repeated.

If the operation is not heater operation in ordinary control (NO in step ST 31), the control unit 13 determines whether the operation is heater operation in ID control, as step ST 33, as shown in FIG. 6. If the operation is heater operation in ID control (YES in step ST 33), the control unit 13 continues the heater operation in ID control, as step 34. The control unit 13 performs the heater operation in ID control, and goes to Z in FIG. 5, and detects a vehicle speed v, as step ST 8. Thereafter, steps at and after ST 9 are repeated.

If the operation is not heater operation in ID control (NO in step ST 33), i.e., the air-conditioning system 10 is initiated from a stop state, the control unit 13 selects heater operation in ordinary control as step ST 35, and sets a temperature of the electric water heater 11b, as shown in FIG. 6.

After setting the temperature of the electric water heater 11b for ordinary control, the control unit 13 warms up the passenger compartment D by heater operation according to the set temperature, as step ST 36. Then, the control unit 13 performs heater operation in ordinary control, goes to Y in FIG. 5, and detects a vehicle speed v, as step ST 13. Thereafter, steps at and after ST 14 are repeated.

If the position of the temperature control dial 22 detected in step ST 2 is any one of P1 to P7 (NO in step 3), the control unit performs cooler operation or blowing operation according to the position of the temperature control dial 22. The cooler operation and blowing operation are performed according to different temperatures set by the temperature control dial 22. A detailed explanation thereof is omitted.

If the temperature control dial 22 is rotated during cooler operation or blowing operation (YES in step ST 19), the control unit 13 returns to step ST 2, and confirms the position of the temperature control dial 22. After the position of the temperature control dial 22 is confirmed, the steps at and after ST 3 are repeated.

If the temperature control dial 22 is not rotated during cooler operation or blowing operation (NO in step ST 19), the control unit 13 determines whether a driver instructs to stop the operation, i.e., a driver rotates the fan setting dial 27 to the OFF position, as step ST 20. If a driver rotates the fan setting dial 27 to the OFF position and stops the heater operation (YES in step ST 20), the control unit 13 stops the operation of the air-conditioning system 10, as step ST 17. If a driver does not stop the operation in step ST 20 (NO in step ST 20), the control unit 13 returns to step ST 18, and continues the cooler operation or blowing operation, until the temperature control dial 22 is operated or the operation is stopped in step ST 19 or 20.

In the electric car 1 equipped with the air-conditioning system 10 configured as described above, the control unit 13 selects one of ID control and ordinary control at different setting temperatures as control of heater operation, based on a vehicle speed v that is one of the conditions of the electric car 1.

The control unit 13 performs heater operation at a temperature assuming heat loss of the electric car 1 during travel as ordinary control, while the electric car 1 is traveling. Therefore, the air-conditioning system keeps a temperature in the passenger compartment D at a target temperature set by the setting dials 16, and the passenger compartment D is kept comfortable while the car is traveling.

The control unit 13 performs heater operation at a temperature assuming heat loss not caused by motion-induced airflow as ID control, while the electric car 1 is idling or traveling at low speed. The air-conditioning system keeps a temperature in the passenger compartment D at a target temperature set by the setting dials 16, and the passenger compartment D is kept comfortable while the car is stationary or traveling at low speed. In other words, a passenger compartment temperature is not unnecessarily increased by using a setting temperature not assuming heat loss by motion-induced airflow.

Heater operation is possible by setting a temperature unnecessarily high, and the power consumption of the air-conditioning system 10 may be minimum required. By operating the air-conditioning system 10 in ID control, the passenger compartment D can be kept at a conformable temperature, and waste of electrical energy of the battery 3 can be prevented. This increases the running distance of the electric car 1.

Further, by setting the vehicle speeds v1 and v2 for switching the ordinary control and ID control to v1<V2, frequent control change is unnecessary at acceleration/deceleration of the electric car 1 or in traffic jams. If the vehicle speeds v1 and v2 for switching the ordinary control and ID control to a range including v1-v2, for example, when the vehicle speed v is v1 (v2), the ordinary control and ID control are frequently switched. In such a case, heater operation in ordinary control may be performed even if a vehicle speed is suitable for ID control. In this case, temperature setting for heater operation may generate unnecessary heat, and the electrical energy may be wasted. However, as in this embodiment, by setting vehicle speeds v1 and v2 for switching the ordinary control and ID control to v1<V2, unnecessary switching of the controls for heater operation can be prevented.

In the electric car 1 equipped with the air-conditioning system 10 configured as described above, the interior of the car can be kept at a comfortable temperature by controlling a passenger compartment temperature by using two or more heater temperature setting tables based on a vehicle speed v. Further, the power consumption can be decreased by preventing an unnecessary passenger compartment temperature increase and unnecessary heater operation. This increases the running distance of the electric car 1.

As described herein, it is possible to provide the air-conditioning system 10 of the electric car 1 and a method of controlling the air-conditioning system 10 of the electric car 1 capable of performing comfortable heater operation according to a travel state of the car and decreasing the power consumption.

The invention is not limited to the embodiments described herein. The invention may be embodied in practical phases by modifying the constituent elements without departing from its spirit or essential characteristics. For example, the setting panel 12 of the air-conditioning system 10 is not limited to the configuration described herein. Of the setting dials 16 on the setting panel 12, the temperature control dial 22 is rotatable about 180°, and has the positions P1 to P13. The rotatable angle may be 120°. The position P may be more minutely divided into P1 to P18, for example.

Further, in the above example, the setting dials 16 are rotatable for setting various conditions. The setting dials may be linearly slidable. The dials may be modified, as long as they can set various conditions for operating the air-conditioning system 10.

The control unit 13 performs heater operation of the air-conditioning unit 11 in ID or ordinary control based on a vehicle speed v. The control unit may have the other control methods. In ID control, setting temperature for the positions P8 to P13 are $T_G$ to $T_L$ (° C.), and the relationship between the setting temperatures is $T_G=T_H<T_I<T_J<T_K<T_L$. The setting temperatures are not limited to them. For example, the setting temperatures may be $T_G=T_H=T_I$. The setting temperature T for the position P may be changed depending on the capacity of the air-conditioning system 10, the form of the car body 2, and other various factors.

Further, in the above example, the control unit 13 has two groups of setting temperatures. The number of the groups of setting temperatures is not limited to two. If more than two groups of setting temperatures are provided, a certain vehicle speed may be added for the control different from the ID control and ordinary control. In other words, a vehicle speed vx other than the vehicle speeds v1 and v2 may be set, and the air-conditioning unit 11 is controlled based on the setting temperature added for the vehicle speed vx. The control unit 13 stores setting temperatures (a table of heater operation setting temperatures). A memory may be provided, and setting temperatures may be stored in the memory.

Further, in the above example, a travel state to select a group of setting temperatures (control) is determined by a delay in a vehicle speed of the electric car 1. The travel state is not limited to this. The travel state may be determined by an external air temperature. For example, certain external air temperatures may be set, and the ID and ordinary control for heater operation may be selected by the predetermined external temperatures. A setting temperature for a travel state may be changed by selecting the control for heater operation by combining a delay in a vehicle speed and external temperatures. The travel state may be any condition, as long as it influences the escape of the heat of the passenger compartment D to the outside. Weather and humidity may be counted as a travel state, in addition to a vehicle and external air temperature.

The invention may be embodied by combining the constituent elements disclosed in the embodiments described herein. For example, some constituent elements may be removed from all constituent elements shown in the embodiments. The constituent elements of different embodiments may be combined. The invention may be embodied in other forms without departing from its spirit and essential characteristics.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An air-conditioning system of an electric car comprising:
    a battery in the car;
    a setting unit configured to selectively set a target temperature by an operator, among a plurality of target temperatures;
    an air-conditioning unit configured to perform heating and cooling operations for a passenger compartment in the car by electrical power supplied from the battery, based on the set target temperature to adjust a temperature of the passenger compartment to the target temperature;
    a vehicle speed detecting unit that detects a vehicle speed of the car;
    a control unit which comprises a first group of setting temperatures corresponding to the plurality of target temperatures, and a second group of setting temperatures corresponding to the plurality of target temperatures, the control unit being configured to select the first group when the detected vehicle speed is equal to or higher than a first predetermined value, and to select the second group when the detected vehicle speed is equal to or lower than a second predetermined value lower than the first predetermined value, to allow the air-conditioning unit to perform the heating operation based on the selected group,
    wherein at least one of the setting temperatures in the first group that corresponds to one of the target temperatures is different from at least one of the setting temperatures in the second group that corresponds to said one of the target temperatures, such that said at least one of the setting temperatures in the second group is lower than said at least one of the setting temperatures in the first group.

2. The system according to claim 1, wherein the setting temperatures in the second group that correspond to a lower target temperature in the setting unit are equivalent to the setting temperatures in the first group.

3. The system according to claim 1, wherein the setting unit is configured to set the target temperatures step by step, and the setting temperatures in the second group are equivalent in multiple low-temperature setting steps in the setting unit.

4. A method of controlling an air conditioning system comprising an air-conditioning unit operated by electrical power supplied from a battery in a car based on a set target temperature to adjust a temperature of a passenger compartment in the car to the target temperature, comprising:
    setting, by an operator for the temperature of the passenger compartment, the target temperature among a plurality of target temperatures;
    determining a vehicle speed of the car;
    providing a first group of setting temperatures corresponding to the plurality of target temperatures, and a second group of setting temperatures corresponding to the plurality of target temperatures, at least one of the setting temperatures in the first group that corresponds to one of the target temperatures being different from at least one of the setting temperatures in the second group that corresponds to said one of the target temperatures;
    selecting the first group when the determined vehicle speed is equal to or higher than a first predetermined value, and selecting the second group when the determined vehicle speed is equal to or lower than a second predetermined value lower than the first predetermined value; and
    performing the heating operation of the air-conditioning unit based on the setting temperatures of the selected group that corresponds to the set target temperature.

* * * * *